July 26, 1966 H. BENTELER ETAL 3,262,624
APPARATUS FOR CONTINUOUSLY PRODUCING WELDED TUBING
Filed Oct. 2, 1963 5 Sheets-Sheet 1

INVENTORS
Helmut Benteler
Wilfried Vogel
BY
Michael J. Striker
ATTORNEY

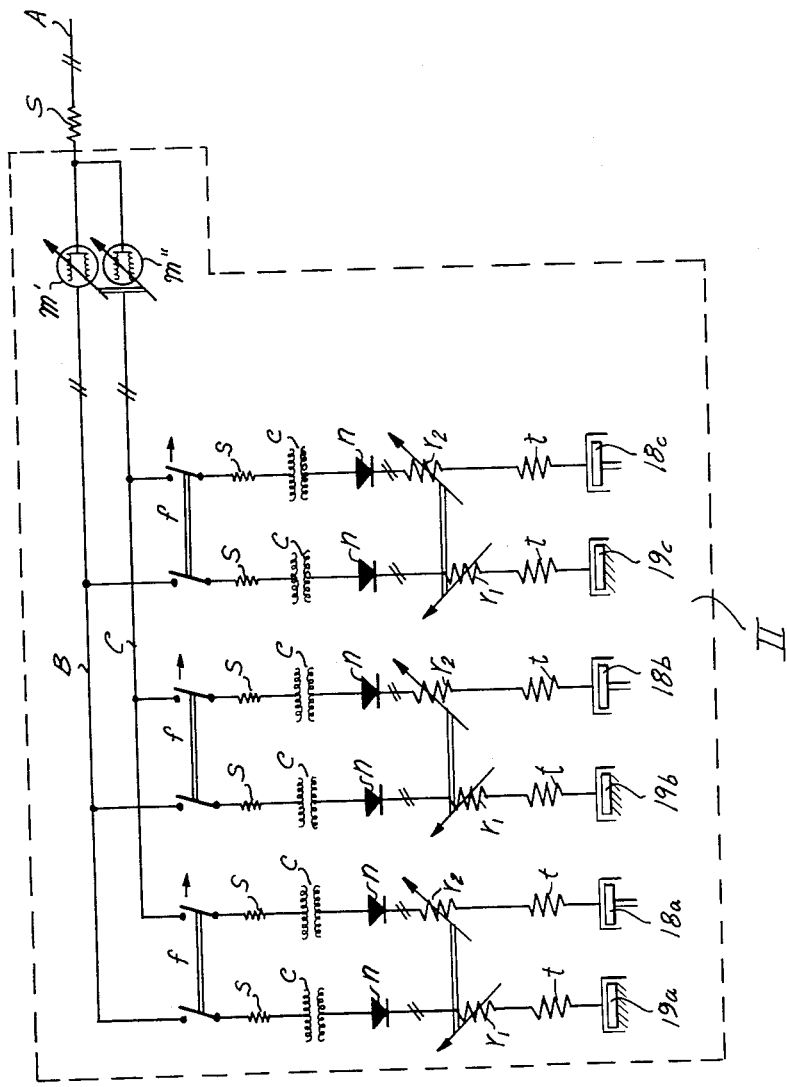

3,262,624
APPARATUS FOR CONTINUOUSLY PRODUCING WELDED TUBING
Helmut Benteler, Bielefeld, and Wilfried Vogel, Paderborn, Germany, assignors to Benteler-Werke AG. Werk Neuhaus, Paderborn, Germany
Filed Oct. 2, 1963, Ser. No. 313,248
Claims priority, application Germany, Oct. 4, 1962, B 69,082
13 Claims. (Cl. 228—17)

The present invention concerns an apparatus for continuously producing small section welded tubing, and more particularly a further development of the apparatus described in U.S. Patent No. 3,075,484. While this patent discloses an apparatus specifically suitable for producing small section welded tubing of the relatively thin wall type, the present invention concerns such a development of the apparatus according to the above mentioned patent which would permit to produce in the same general manner also tubing of relatively considerable wall thickness.

The apparatus according to patent No. 3,075,484 comprises a bending mill for roll-forming a slotted tube from a flat metal strip, a welding station and, following this station, a cold rolling reducing mill which is equipped with a plurality of sets of rolls, each set being offset angularly 90° in transverse direction relative to the preceding and the respectively following set, at least some of these rolls having an oval groove and being driven at different rotary speeds, the rotary speed increasing stepwise from set to set of rolls so as to produce a longitudinal tension in the welded tube for stretching the latter, at least the last one of said sets of rollers having a circular groove for giving the tube its final circular shape. This known apparatus is characterized by the combination of the following elements:

(a) the cold rolling reducing mill is equipped with a series of sets of oval groove rolls, one set following immediately the preceding set, without a set of circular groove rolls therebetween, and offset one against the other angularly 90° in transverse direction;

(b) the bending or roll-forming mill does not include any drive means, its forming rolls being freely rotatable; and (c) deforming guide means arranged between the welding station and the cold rolling reducing mill and comprising means engaging the welded tubing and deforming the latter temporarily in order to prevent a torsional effect caused by the reducing mill to extend into the welding station.

On account of these features the known apparatus permits the conversion of a metal strip of standard width and of a thickness corresponding to the desired wall thickness of the tube to be produced into welded tubes of greatly varying finish dimensions down to about 3 mm. outer diameter and 0.25 mm. wall thickness, the variation of these dimensions depending only upon the addition or elimination of the respectively selected last sets of rolls of the reducing mill. This effect is based first of all on the capability of the cold rolling reducing mill according to element (a) to produce a comparatively very high reduction of the cross section of the tube in a manner similar to the results of hot rolling. However, this capability of the cold rolling reducing mill can be utilized in the production of tubing from comparatively thin and relatively wide metal strips, in view of the requirement of a faultless welding of the slotted tube only if the metal strip is roll-formed by a bending mill according to element (b) which has only freely rotatable forming rolls so that the strip is pulled through the bending mill by the action of the cold rolling reducing mill. Finally, it is necessary to provide for the element (c) between the welding station and the reducing mill in order to counteract the torsional or twisting forces emanating from the action of the reducing mill so as to prevent torsion of the tube to affect the welding operation. In this system the bending mill which does not cause by itself a forward movement of the metal strip serves by its operation only partially the purpose of keeping the relatively thin and therefore delicate metal strip free of tensional stresses during the roll-forming process, but has the important task to maintain a uniform tension within the metal strip and within the tubing formed thereof, a condition which is of importance for obtaining a faultless welding of the slotted tube and for the operation of the cold rolling reducing mill.

Against this background it is one object of this invention to provide for an improvement in further development of the above described known apparatus in order to be able to produce with the modified apparatus also tubing of relatively considerable wall thickness, namely under the condition that the slotted tube before entering the cold rolling reducing mill has a wall thickness over 1.0 mm., but a ratio between wall thickness and outer diameter exceeding 0.075.

Aiming at this object is the result of finding that in the case of the above mentioned greater ratios between wall thickness and outer diameter the conventional apparatus does not work satisfactorily. In order to fully utilize the reducing capability of the reducing mill a longitudinal pull or tension would be required which exceeds the effect of the natural elongation of the tube in response to only the radial rolling pressure and thus produces an additional stretching of the tube material. Such a longitudinal pull or tension cannot be produced by the action of the reducing rolls on the tube if the ratio between wall thickness and the tube diameter exceeds the above mentioned value. Therefore, in these cases an undesired increase of the wall thickness could not be avoided except that either a lesser reduction of the cross section or a substantial increase of the number of sets of reducing rolls is accepted.

Another object of the invention is the modification of the conventional apparatus by adding thereto comparatively simple and reliable control means.

With above objects in view the invention includes in an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and means for causing at least one pair of said forming rolls to apply a drag to said strip being formed, said drag being produced by said means causing the speed of said strip passing between said forming rolls to be smaller than that of said welded tube passing between the first set of said series of sets of rolls of said reducing mill.

It will be shown that in this manner the drag or braking action exerted by the bending mill and substantially exceeding the effect of the mass inertia of freely rotatable forming rolls makes it possible to produce in the apparatus not only thin wall tubes but to process also satisfactorily such metal strips which would yield a slotted tube with a wall thickness over 1.0 mm. with a ratio between wall thickness and the outer tube diameter exceeding 0.075.

In order to fully understand and explain the effect of the invention the following should be taken into consideration:

If one starts from the assumption that all the sets of rolls of the reducing mill are driven by a common motor by means of a main shaft and individual gear connections which apply to the individual sets of rolls operating speeds increasing uniformly in steps from set to set in order to produce a uniform gradual decrease of the cross section of the tube, then the additional longitudinal tension exceeding the natural elongation of the tube and indispensable for maintaining a certain wall thickness is the result of the fact that as the outer diameter of the tube decreases the diameter of the rolls increases correspondingly which leads to a corresponding increase of the circumferential speeds thereof. If such an additional longitudinal tension exceeding the natural elongation of the tube were to be avoided, then it would be necessary to provide for a smaller reduction of the cross section from set to set corresponding to the increasing roll diameters. From this it is to be concluded that if the outer diameter remains unchanged but the ratio of wall thickness to the diameter increases, also a proportionally greater reduction of the cross section of the tube from set to set would be necessary and would consequently call for a correspondingly greater stretching tension.

If these considerations are applied to a cold rolling reducing mill in which each set of rolls has its own drive motor with an associated individual transmission gear, then the above described possibility of producing a longitudinal pull is supplemented by the possibility of varying the rotary speeds of the individual drive motors.

If the second set of rolls following the first or intake set of rolls rotates due to corresponding speed adjustment of its drive motor at a speed which is greater than would correspond to the elongation of the tube caused by the reduction of its cross section, then the tube is pulled through the first set of rolls at a speed which is relatively greater than that set for this first set of rollers so that a reversed torque develops therein which has a certain, but limited drag or braking effect. The same effect takes place in the next following sets of rolls, the tube assuming in each case the speed of the inbetween set of rolls while the next following set of rolls exerts a pull while the preceding set of rolls produces the drag or braking resistance necessary for setting up the desired tension.

The longitudinal tension produced in this manner in the tube has the effect that at the moment when through the action of the rolls the cross section of the tube is reduced the free deformation is eliminated and the flow of material is directed in the longitudinal direction of the tube while an otherwise unavoidable increase of the wall thickness is avoided.

The longitudinal tension that can be produced in the tube on account of the stepped up speeds of consecutive sets of rolls is limited on account of the friction conditions existing between the rolls and the tube. According to well known interrelationships only about 10 to 15% of the speed increase can be utilized effectively for producing the tube stretching pull, while about 85 to 90% are lost by slip. Consequently also the possibilities of maintaining a certain wall thickness are limited, namely in such a manner that above a predetermined ratio between wall thickness and outer diameter either an increase of the wall thickness must be accepted while utilizing the optimum diameter decrease per set of rolls, or one has to resort to a greater number of roll stands or sets of rolls in connection with a correspondingly smaller diameter decrease per set of rolls.

If these considerations are applied to an apparatus according to the prior art e.g. the patent No. 3,075,484 mentioned above, the production of a welded tube with 4.5 mm. outer diameter and 0.6 mm. wall thickness would require 25 roll stands or sets of rolls, while the production of a tube of 4.5 mm. outer diameter with 1.5 mm. wall thickness out of a slotted tube of 20 mm. outer diameter and the same wall thickness would require 4 more roll stands i.e. a total of 29 roll stands or sets of rolls.

These difficulties and drawbacks are overcome and avoided by the invention because it teaches to generate the drag producing or braking forces which are required but cannot be generated within the cold rolling reducing mill, instead in the bending or roll-forming mill located along the path of movement of the tube in advance of the reducing mill and the welding station while the metal strip is pulled by the reducing mill past and between the forming rolls with a continuous and constant pull or tension.

In order to make sure that in view of the desired additional longitudinal or braking pull the forming rolls of the bending mill rotate with a circumferential speed somewhat smaller than that of the first or intake set of rolls of the reducing mill, the forming rolls of the bending mill are operatively supplemented with braking means, e.g. induction brakes or motors capable of dynamic braking the rotary speed whereof is adjustable to a speed slightly smaller than that of the speed used in the reducing mill so that the resulting drag or braking power can be adjusted easily to match the existing ratio between wall thickness and outer diameter of the slotted tube formed from the particular metal strip and may also be set to a fixed value for carrying out a certain particular production program.

Of course it is to be understood that the apparatus according to the invention is not limited to processing slotted tubes with a ratio between wall thickness and tube diameter exceeding the above mentioned value of 0.075 but may also be used advantageously, depending upon the thickness of the metal strip or tube wall, also in the case of a ratio between wall thickness and tube diameter below 0.075. On the other hand, the usefulness of the apparatus according to the invention is limited in the direction toward smaller ratios between wall thickness and tube diameter, namely in those cases where with wall thickness below about 1.0 mm. no necessity exists of producing an additional braking pull because in this case within the reducing mill the existing friction conditions and the mass inertia of the rolls and drives produce stretching forces which are sufficient for avoiding an increase of the wall thickness; on the other hand, the danger may be entailed that the braking forces exerted on the metal strip being roll-formed might produce tearing or distorting effects on the strip on account of its very small thickness.

Since the known apparatus according to Patent No. 3,075,484 is intended and suited for the production of tubing with a great variety of final dimensions it is advisable according to the invention to construct the braking means added to the bending or roll-forming mill in such a manner that these braking means are rendered operative only when slotted tubes are processed which have a comparatively large ratio between wall thickness and outer diameter, while these brake means can be rendered inoperative when slotted tubes with a smaller ratio between wall thickness and outer diameter and with a thickness below about 1.0 mm. are processed so that in this latter case the forming rolls may be freely rotatable.

Although it is generally advisable to provide all the roll sets of the roll-forming mill with braking means of one or the other type, it may be sufficient in certain cases to provide braking means only for some or even only for one of the pairs or sets of forming rolls in which case preferably the first set or sets of forming rollers, looking in the direction of the strip movement, are selected for serving as braking devices.

Although it is fundamentally irrelevant, with respect to putting the invention into effect, which type of braking means is provided for reducing the circumferential speed of the forming rolls of the bending or roll-forming mill somewhat relative to the circumferential speed of the rolls of the first or intake set of rolls of the reducing mill, it is advisable, in one embodiment of the invention, to construct the braking means as inductance brake means of conventional type because these induction brakes can be very finely adjusted or regulated and are not subject to wear because they do not comprise brake members in frictional engagement.

In order to be able to adjust the rotary speeds of all sets of forming rolls relative to each other in such a manner that the metal strip does not undergo distortions during the forming process in spite of the differing radial distances of the forming rolls from the longitudinal axis of the slotted tube and in order to be able, on the other hand, to regulate the rotary speeds of all the sets of forming rolls so as to exert a uniform braking pull corresponding to a certain existing ratio between wall thickness and outer diameter of the slotted tube, it is advisable to regulate the operating speed of the bending or roll-forming mill by means of one common control or variable transformer for applying a variable voltage simultaneously to all the energization coils of all the induction brakes while the adjustment of the braking torque or of the rotary speed of all the sets of forming rolls to one identical circumferential speed of all of said forming rolls is to be carried out by means of variable resistors connected individually between the variable transformer and the individual induction coil so as to regulate the energizing current of each individual induction brake.

However, in many cases it will be of advantage to produce the braking effect in the bending or roll-forming mill not by induction brakes or the like but by means of motors capable of dynamic braking whereby the bending or roll-forming mill i.e. its series of sets of forming rolls is given an operating speed which is somewhat lower than that of the first or intake set of rolls of the reducing mill. This embodiment of the invention is of particular advantage in all those cases in which the sets of rolls of the reducing mill are driven by individually controllable, variable speed direct current shunt motors which are supplied anyway via a Ward-Leonard converter set and via a pertaining output bus bar, the speed of these motors being adjustable jointly by variation of their armature voltage through the voltage supplying Ward-Leonard converter set, and the speed of the individual motors being variable by individual variation of the exciter voltage thereof. In this case the possibility exists to associate also the sets of forming rolls of the bending or roll-forming mill with variable speed direct current motors supplied also from the above mentioned output bus bar and to use these direct current shunt motors as braking means. In this case the rotary speeds of the direct current shunt motors associated operatively with the sets of forming rolls can be adjusted individually for each motor by means of adjusting resistors which vary the exciter current so that in this manner an identical circumferential speed of all the forming rolls can be obtained, while for the purpose of varying the braking pull of the bending mill relative to the pull exerted by the reducing mill the already equalized rotary speeds of all the motors driving the forming rolls may be regulated by common variation of the exciter voltage thereof by means of a common variable transformer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a schematic circuit diagram of a modified form of the drive, control and braking means, and corresponding to FIG. 4.

Figure 1:
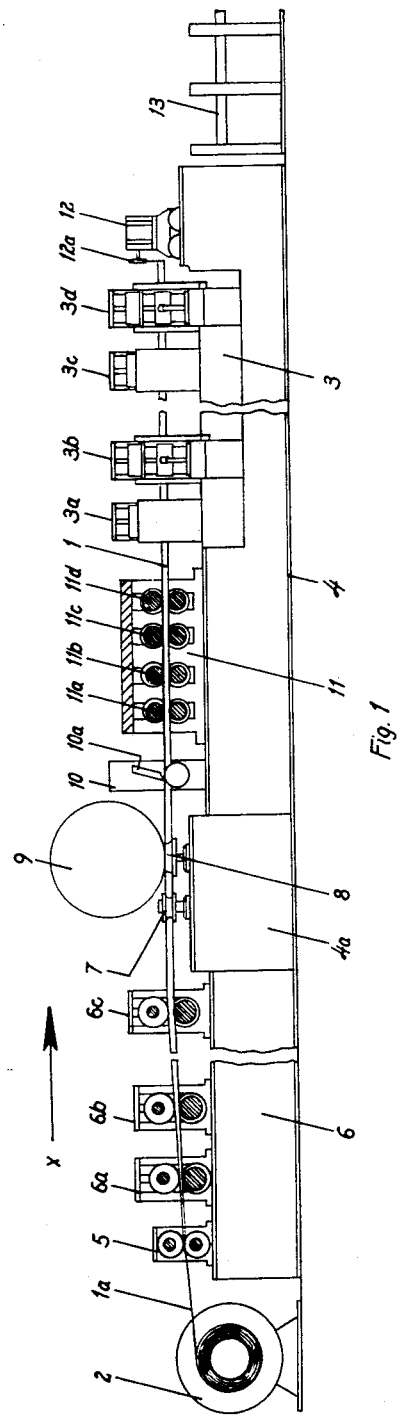
FIG. 1 is an elevation, partly in section, of an apparatus according to the invention.

In FIG. 1 showing the entire apparatus in elevation the strip of deep drawing steel 1a is shown as being unwound from a stock reel 2 and the steel tube formed therefrom first as a slotted tube and afterwards welded along a longitudinal seam is designated with 1. All details of the illustrated apparatus as far as they are conventional are described in full detail in the above mentioned Patent No. 3,075,484. In the same manner as in the apparatus described therein the steel tape or strip 1a is unwound from the reel 2 exclusively by the pull exerted on the tube 1 in the reducing mill 3 and the strip 1a as well as the tube is pulled in cold condition in the direction of the arrow x through all the stations of the apparatus.

The base frame 4 supports all the various stations of the apparatus. The steel strip 1a passes first a rotary cutter 5 the cutting wheels whereof shear or trim the rough edges of the steel strip so as to determine a desired and predetermined width of the strip to be converted into a tube.

The trimmed strip enters hereafter the bending or roll-forming mill 6 which comprises at least the sets of forming rolls 6a, 6b and 6c and which are so formed and arranged relative to each other that the strip 1a is converted into a slotted tube with the slot being located in a vertical plane. The sets of forming rolls 6a–6c are either freely rotatable or are operatively connected with braking means in order to produce a drag on the tube being formed as will be described further below.

A raised portion 4a of the frame 4 supports a pair of rolls 7 rotatable in a horizontal plane which serve to advance the edges of the slot of the slotted tube toward each other so as to close this slot immediately before the subsequent welding operation. The pair of rolls 7 is exchangeable and supported on vertical pivots the spacing of which is variable. The set of rolls 7 is freely rotatable and is arranged as close as possible to the welding station described heerafter. The welding station comprises a pair of support rollers 8 and a rotary electrode disc 9 which serves in a conventional manner for applying the welding current to the slot area of the tube. The welding station may further comprise a burr remover device 10 including a knife or the like 10a for removing a burr or bead remaining on the outside of the welded tube after the welding operation.

Following in the direction of movement x of the welded tube 1 a guiding arrangement 11 as described in greater detail in Patent No. 3,075,484 is mounted on the base frame 4. This guiding device is provided for preventing torsional movements of the welded tube 1 as caused by the following reducing operation to affect the welding operation. In the illustrated embodiment the guiding device is composed of a plurality of sets of rolls 11a, 11b, 11c, and 11d, each set differing from the neighboring one inasmuch as alternatingly one set is equipped with circular groove rolls and the next following set is equipped with oval groove rolls, all the rolls rotating freely and in a common vertical plane. These sets of guiding and deforming rolls serve the purpose mentioned above namely to prevent torsional stress in the welded tube to affect the welding operation. The rolls having an oval or elliptical groove produce a small distortion of the tube profile so that the latter definitely differs from a circular profile whereby a torsional movement of the tube in the area of the guide rolls of the device 11 is safely prevented.

After the guiding arrangement 11 follows the cold rolling reducing mill 3. This mill comprises a plurality of roll stands or sets of rolls 3a–3d of which the sets 3a–3c comprise each a set of rolls offset angularly 90° in transverse direction against the neighboring set of rolls, all these rolls of the sets 3a–3c having an oval groove embrace or engage taken together the entire circumference of the welded tube so that the welded tube is continuously moved in the direction x while the outer diameter thereof is gradually and stepwise reduced without changing thereby the wall thickness existing at the input end. The ultimate or last set of rolls 3d has a round groove and produces the final accurate calibration of the tube. Depending upon the desired final outer diameter of the tube the number of the roll stands or sets of rolls in the device 3 with the exception of the set 3d may be decreased or increased as may be desired, the calibrating round groove set of rolls 3d remaining always the last set of rolls of this arrangement.

Following the cold rolling reducing mill 3 a rotary saw 12 movable both in transverse and in longitudinal direction on a support base 4b is provided. The amounts of transverse and longitudinal movement of this saw 12 must be adjusted to the size of the particular tube, its velocity of travel at the output of the reducing mill, and to the desired lengths of tubing to be cut. While the saw 12 travels with the tube in direction x a transverse cut of the tube is produced so that the cut off length of tube will subsequently drop on a receiving frame 13 or the like for further disposition.

Figure 2:
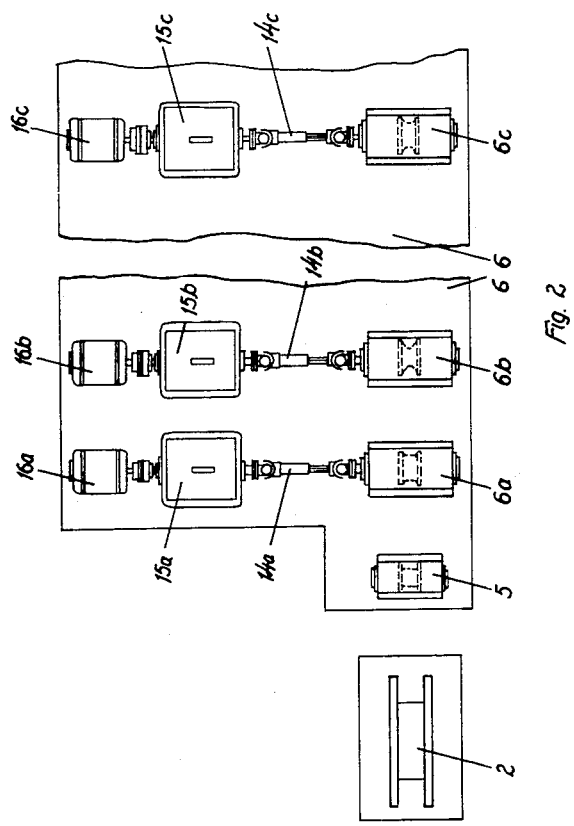
FIG. 2 is a diagrammatic plan view of a portion of the bending mill forming part of the apparatus according to FIG. 1.

In case in an embodiment of the invention direct current motors are selected for being used as braking means for the sets of forming rolls 6a, 6b and 6c of the bending or roll-forming mill 6, then also these sets of rolls exactly as the sets of rolls of the reducing mill 3 are operatively connected individually via universal-joint shafts 14a, 14b, 14c, respectively, and interposed speed reduction gears 15a, 15b, 15c, respectively, with direct current shunt motors 16a, 16b, 16c, respectively, as shown by FIG. 2.

Figure 3:
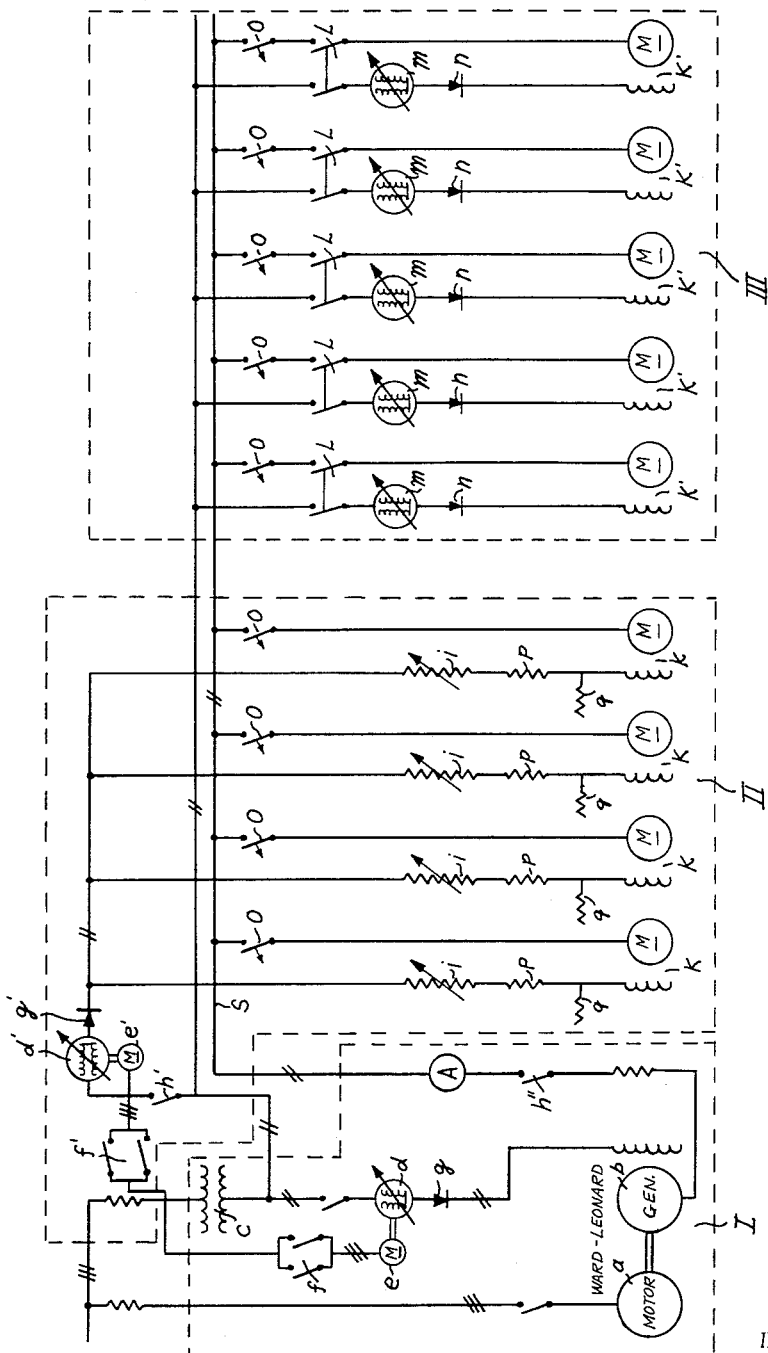
FIG. 3 is a schematic circuit diagram of the electric drive, control and braking means incorporated in the arrangement according to FIGS. 1 and 2.

The circuit arrangement of such a system is illustrated by FIG. 3.

In FIG. 3 the portion I surrounded by a dotted frame represents a Ward-Leonard converter set servicing both the bending or roll-forming mill and the cold rolling reducing mill, while the dotted frame II refers to the bending or roll-forming mill and the framed portion III refers to the cold rolling reducing mill. The welding and guiding stations interposed according to FIG. 1 between the bending mill 6 and the reducing mill 3 are not illustrated in FIG. 3 because they do not incorporate any electric circuitry cooperating directly with the circuits illustrated by FIG. 3.

As is well known, in an electromagnetic arrangement the magnetic flux can be varied by varying the respective energizing or exciter current which phenomenon is utilized in direct current shunt motors for causing the maximum permissible torque to decrease as the rotary speed increases while the consumed electrical power remains constant. If now during operation the load torque exceeds the torque produced by the action of the applied voltage, then the armature current reverses its direction so that the operation of the motor is steplessly changed from motor operation into generator operation so as to return electrical energy into the feeding network. This operation is known as dynamic braking and is utilized according to the invention for producing a braking effect in the bending or roll-forming mill.

Since on the other hand variations of the armature voltage cause a corresponding variation of the electromotive force and thus of the rotary speed provided that the excitation remains constant as well as the maximum torque delivered by the motor, while the power output drops in proportion with the rotary speed, it is possible to raise the rotary speed from zero to a desired value only by varying the armature voltage.

As is known this method is utilized in an arrangement comprising a Ward-Leonard control in which case the armature voltage is varied by varying the exciter voltage of the Ward-Leonard generator. Since the generator of the Ward-Leonard converter set and the armatures of the individual direct current motors are directly connected conductively with each other, it is possible, while the energization of the exciter winding of the various direct current motors is kept constant, to slow down the motor of the Ward-Leonard converter set by lowering the generator voltage below the electromotive force of the individual motors supplied thereby.

In the arrangement according to FIG. 3 the three-phase motor of the Ward-Leonard converter set is designated with $a$ while the direct current generator mechanically coupled therewith is designated by $b$.

The excitation of the generator $b$ is effected, instead of the conventional exciter generator, via the three-phase supply network through an input transformer $c$, with a variable transformer or induction regulator $d$ serving as excitation control and a selenium rectifier $g$ being connected in series between the transformer $c$ and the exciter winding of the generator $b$. The adjustment of the variable transformer $d$ is effected by means of a three-phase motor $e$ the direction of rotation whereof can be selected or determined by corresponding actuation of a reversing switch $f$ connected between the motor $e$ and the source of three-phase current.

As can be seen further from FIG. 3, all the direct current shunt motors K associated with the sets of forming rolls of the bending or roll-forming mill 6 as well as all the direct current shunt motors K' provided for driving the sets of rolls of the reducing mill 3 are supplied with the output voltage of the Ward-Leonard generator $b$ via a common bus bar S.

The excitation of the generator $b$ which is supplied via the main transformer $c$ and the rectifier $g$ may be varied by means of the interposed variable transformer $d$ controllable by the motor $e$. By such variation of the excitation of the generator $b$ it is possible to generally regulate the speed of the welding operation which is identical with the feeding speed of the first or intake set of rolls 3a of the reducing mill 3 and also with the operating speed of the bending or roll-forming mill 6 as long as the rolls thereof are permitted to rotate freely.

In a fundamentally identical manner also the exciter voltages of the direct current motors K associated with the forming rolls of the bending or roll-forming mill 6 are regulatable by means of a second variable transformer $d'$ which is connected in series with a rectifier $g'$ between the main transformer $c$ and all of the exciter coils of the motors K. For controlling the variable transformer $d'$ a three-phase motor $e'$ is coupled therewith mechanically and is supplied from the main network via a reversing switch $f'$ for being operated so as to rotate in one or the opposite direction. On the other hand, the individual drive motors K' have their exciter coils connected with the main transformer $c$ via variable transformers $m$ and rectifiers $n$, one such set of variable transformer and rectifier for each individual exciter coil. Thus the excitation of these drive motors K' can be regulated separately and independently from each other which is necessary because otherwise the gear ratio between the individual drive motors and the respectively associated reducing rolls would never correspond to the actually occurring elongation of the tube being processed on account of the respective reduction of the cross section thereof. Therefore the individual drive motors K' must be individually adjusted in the same manner as the generator $b$ by the operator before start of operation.

The adjustment of the rotary speeds of the individual motors K of the bending or roll-forming mill 6 so as to produce identical circumferential speeds of all the forming rolls in the sets 6a–6c is carried out by means of individual adjusting resistors $i$ individually arranged in the respective exciter circuits together with a fixed series resistor $p$ and a load resistor $q$. However, the drag or braking effect i.e. the adjustment of the rotary speed of the motors K so as to be smaller than the rotary speed of the first or intake set of rolls of the reducing mill 3, is effected uniformly and jointly for all the motors K by adjusting the variable transformer $d'$. Thus, when a braking effect is desired and the motors K are switched on the amount of drag or braking effect can be adjusted from zero to any desired value only by changing the transformation ratio in the variable transformer $d'$ by operating the control motor $e'$.

The armature of each one of the motors K and K' is connected with the bus bar S via the individual switch $o$ which are so interconnected with the circuitry by conventional means, not shown, that in the case of dropout of one of the motors K' of the reducing mill 3 the operation of the entire apparatus is stopped. In addition, relay switches $h'$ and $h''$ are provided as illustrated, the latter relay switch $h''$ making it possible to disconnect or at least temporarily disconnect the entire apparatus from the energy supply e.g. in the case of breakdown or failure of a component, while the first mentioned relay switch $h'$ can be used for eliminating the braking effect of the motors K of the roll-forming mill 6 without affecting the continued operation of the reducing mill 3. This may be desired when during manufacture of tubes a metal strip of a particular size or thickness used for producing a certain type of tube is replaced by a different strip of metal having different dimensions in order to produce a different type of tube whose wall thickness and ratio between wall thickness and diameter are such that the above described drag or braking effect for producing an additional tension in the tube being produced is not needed. It is evident that when the relay switch $h'$ is in non-conductive position the forming rolls of the bending or roll-forming mill 6 rotate freely without being influenced by their being coupled mechanically with the respective motors K so that the rotation of the forming rolls is effected only by their engagement with the metal strip 1a which is pulled forward by the action of the reducing mill 3.

The switches L respectively associated with the individual drive motors K' of the reducing mill 3 are provided for the purpose of making it possible to disconnect and to render inoperative any one of the drive motors K' and thereby the respectively associated set of reducing rolls when, as mentioned above, a certain number thereof should not be required in the course of the particular tube manufacture.

While in FIG. 3 an embodiment of the invention as described above is illustrated which is characterized by the use of direct current shunt motors as means for producing the desired braking effect by dynamic braking, it will be understood that, as already mentioned further above, a similar or identical braking effect can be produced in a well known manner by induction brake means of well known type. An embodiment of this modified version of braking means is illustrated, as far as it differs from the above described embodiment, by FIGS. 4 and 5.

Figure 4:
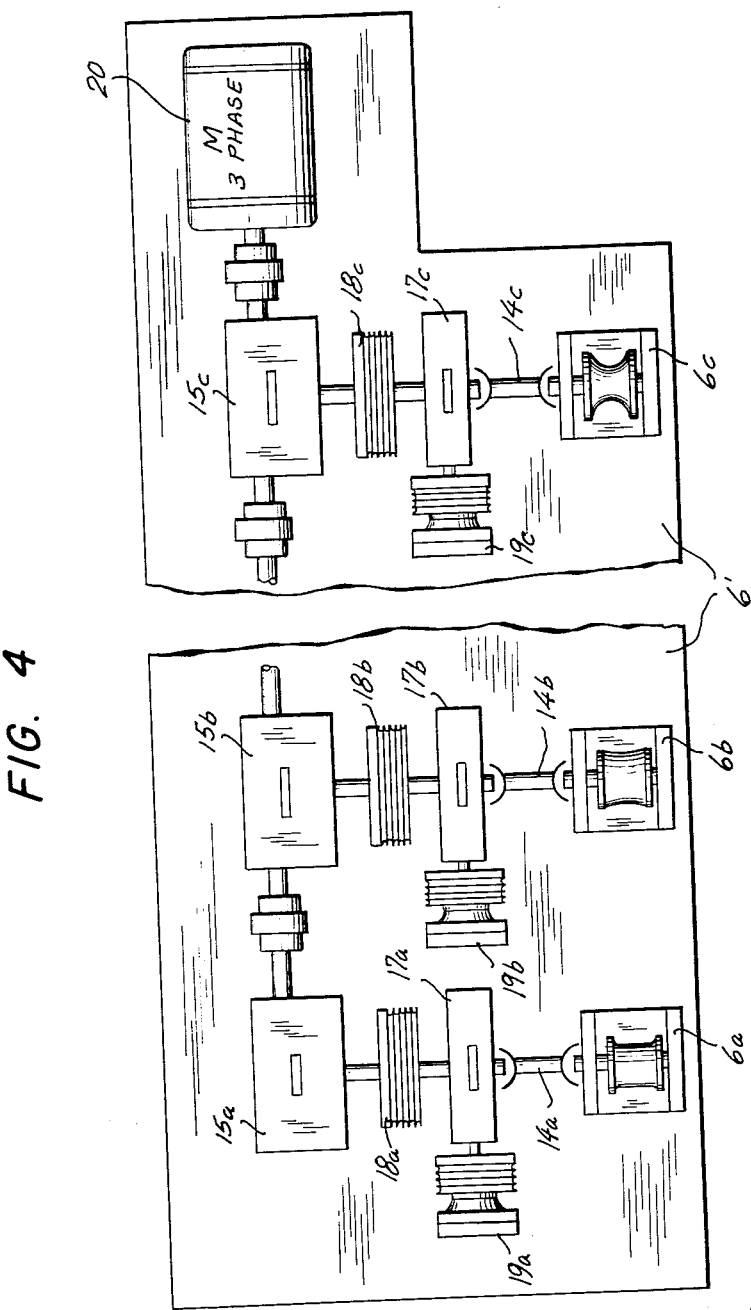
FIG. 4 is a diagrammatic plan view of a portion of the bending mill in a version different from that of FIG. 2.

FIG. 4 illustrates the modified form of the bending mill 6' comprising a plurality of sets of forming rolls or roll stands 6a, 6b and 6c. All these forming rolls are driven by a single 3-phase motor 20 which replaces the individual motors K of FIG. 3. This motor drives a series of gear transmissions 15a, 15b and 15c and each of these gear transmissions transmits the drive to one of the universal-joints shafts 14a, 14b, 14c, respectively, which in turn, are the drive connection for the above mentioned sets of forming rolls 6a, 6b, 6c, respectively. However, between each of the transmission gears 15a–15c and the respective shafts 14a–14c additional gear transmissions 17a–17c, respectively, are inserted which are coupled with the induction brakes of conventional design 19a–19c, respectively. It is evident that by suitable energization of the induction brakes the desired braking effect on the respectively associated set of forming rolls is obtained. It will be shown that the braking effect can be adjusted individually for each set of bending rolls. However, in order to prevent a certain braking effect produced, e.g. on the forming roll set 6a to affect the drives of the other forming rolls, induction couplings of conventional type 18a–18c are inserted between the gear transmissions 15a–15c and the gears 17a–17c, respectively.

FIG. 5 illustrates the electrical control of the arrangement according to FIG. 4.

For obvious reasons the energy supply to the induction brake and the induction coupling associated with each set of forming rolls must be arranged in such a manner that, for instance, when the braking effect and therefore the energization of the induction brake of one particular set of forming rolls is increased, the energization of the associated induction coupling must be decreased. This is taken into consideration in the arrangement according to FIG. 5. As can be seen, the control circuits for each of the groups of induction brake and induction coupling 19a, 18a; 19b, 18b; 19c, 18c, are of identical nature when they are with each other. For example, the set of forming rolls 6a is associated with the induction brake 19a and induction brake 18a. The energy supply to these two components can be switched on and off by the double-pole switch $f$. The induction brake 19a is connected with a switch $f$ via fixed resistors $s$ and $t$, a transformer $c$, a rectifier $n$, and a variable resistor $r_1$. Similarly the associated induction coupling 18a is connected with the switch $f$ via fixed resistors $s$ and $t$, a transformer $c$, a rectifier $n$ and a second variable resistor $r_2$. For the reasons mentioned above, the two variable resistors $r_1$ and $r_2$ are mechanically coupled with each other so that adjusting one of them so as to increase its resistance causes at the same time a decrease of the resistance of the other. The arrangement is analagous in the control of the sets of forming rolls 6b and 6c. In this manner, the degree of braking effect can be accurately and easily adjusted for each one of the sets of forming rolls, and each of the sets can be freed of any intentional and adjusted braking by opening any or all of the switches $f$.

From the general energy input A, one bus bar B is taken to all of the induction brakes while another bus bar C is taken to all of the induction couplings. Arranged within these bus bar connections B and C are two adjustable transformers M' and M" which are mechanically coupled so that any adjustment of the input voltage uniformly affects the energy input into the above described individual control circuits. The fixed resistors $t$ must be, and preferably are, circuit breakers for the protection of the induction coils, and the resistors $s$ may be, and preferably are, fuses or similar protection elements.

In operation the arrangement according to FIGS. 4 and 5 operates practically in the same manner as the embodiment according to FIGS. 1–3.

It will be understood that each of the elements described above, or two or more together, may also find a useful application in other types of apparatus for continuously producing small section welded tubing differing from the types described above.

While the invention has been illustrated and described as embodied in apparatus for continuously producing small section welded tubing of relatively considerable wall thickness, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and means for causing at least one pair of said forming rolls to apply a drag to said strip being formed, said drag being produced by said means causing the speed of said strip passing between said forming rolls to be smaller than that of said welded tube passing between the first set of said series of sets of rolls of said reducing mill.

2. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and braking means for causing at least one pair of said forming rolls to apply a drag to said strip being formed, said drag being produced by said braking means causing the speed of said strip passing between said forming rolls to be smaller than that of said welded tube passing between the first set of said series of sets of rolls of said reducing mill.

3. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and braking means including induction brake means respectively cooperating with at least one pair of said forming rolls for causing the latter to apply a drag to said strip being formed, said drag being produced by said braking means causing the speed of said strip passing between said forming rolls to be smaller than that of said welded tube passing between the first set of said series of sets of rolls of said reducing mill.

4. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and braking means including a plurality of induction brake means each comprising an induction coil and respectively cooperating with at least one pair of said forming rolls for causing the latter to apply a drag to said strip being formed, said drag being produced by said braking means causing the speed of said strip passing between said forming rolls to be smaller than that of said welded tube passing between the first set of said series of sets of rolls of said reducing mill, said braking means including a variable transformer connected between a source of electric energy and all of the induction coils of said plurality of induction brake means for jointly and uniformly adjusting the energization thereof.

5. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and braking means including a plurality of induction brake means each comprising an induction coil and respectively cooperating with at least one pair of said forming rolls for causing the latter to apply a drag to said strip being formed, said drag being produced by said braking means causing the speed of said strip passing between said forming rolls to be smaller than that of said welded tube passing between the first set of said series of sets of rolls of said reducing mill, said braking means including a variable transformer connected between a source of electric energy and all of the induction coils of said plurality of induction brake means for jointly and uniformly adjusting the energization thereof, and a plurality of adjustable resistance means individually connected in series between said transformer and said induction coils, respectively, for adjusting the energization thereof in such a manner that all of said forming rolls operate at identical circumferential speed.

6. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and braking means including motor means capable of dynamic braking and respectively cooperating with at least one pair of said forming rolls for causing the latter to apply a drag to said strip being formed, said drag being produced by said braking means causing the speed of said strip passing between said forming rolls to be smaller than that of said welded tube passing between the first set of said series of sets of rolls of said reducing mill.

7. In an apparatus for continuously producing small section welded tubing of relatively considerable wall thickness, in combination, a cold rolling reducing mill including a series of sets of rolls for reducing the diameter of a welded tube advancing continuously through said reducing mill, the latter tensioning and stretching said tube while longitudinally advancing the same, said reducing mill including Ward-Leonard converter means for converting an alternating current input into direct current output, bus bar means carrying said direct current output, direct current shunt motors respectively cooperating with said sets of rolls for driving the latter at speeds adjustable individually and jointly by adjustment of the voltage applied to said motors, respectively; welding means located along the path of movement of said tube in advance of said reducing mill for welding together the edges of a slotted tube, said welding means including rolls for advancing said edges toward each other and for forming from said slotted tube a tube of substantially circular cross-section, said rolls being freely rotatable and said reducing mill pulling said tube through and beyond said welding means; and a bending or roll-forming mill located along the path of movement of said tube in advance of said welding means for continuously converting a flat metal strip moving into said bending mill into said slotted tube, said bending mill including a plurality of sets of forming rolls in serial arrangement, and braking means including a plurality of direct current shunt motor means capable of dynamic braking and respectively cooperating with at least one pair of said forming rolls for causing the latter to apply a drag to said strip being formed, said drag being produced by said braking means causing the speed of said strip passing between said forming rolls to be smaller than that of said welded tube passing between the first set of said series of sets of rolls of said reducing mill, said shunt motors of said bending mill having their armatures connected with said bus bar means for energy supply, variable transformer means and rectifier means being connected between a source of alternating voltage and the field windings of all of said shunt motors of said bending mill for jointly varying the rotary speeds thereof, and additional individual voltage regulator means arranged respectively between said field windings and said variable transformer means for individually adjusting said rotary speeds so as to produce equality between the circumferential speeds of all said forming rolls.

8. An apparatus as claimed in claim 2, wherein means are provided for rendering said braking means alternatively operative and inoperative as may be desired.

9. An apparatus as claimed in claim 3, wherein means are provided for rendering said braking means alternatively operative and inoperative as may be desired.

10. An apparatus as claimed in claim 4, wherein means are provided for rendering said braking means alternatively operative and inoperative as may be desired.

11. An apparatus as claimed in claim 5, wherein means are provided for rendering said braking means alternatively operative and inoperative as may be desired.

12. An apparatus as claimed in claim 6, wherein means are provided for rendering said braking means alternatively operative and in operative as may be desired.

13. An apparatus as claimed in claim 7, wherein means are provided for rendering said braking means alternatively operative and inoperative as may be desired.

References Cited by the Examiner

UNITED STATES PATENTS

| 1,124,760 | 1/1915 | Lloyd | 228—17 |
| 2,027,607 | 1/1936 | McGuire | 219—59 |
| 2,464,402 | 3/1949 | Kents | 219—59 |
| 3,014,118 | 12/1961 | Vassar | 219—59 |

CHARLES W. LANHAM, *Primary Examiner.*

R. J. HERBST, *Assistant Examiner.*